United States Patent
Bishop et al.

(10) Patent No.: US 11,410,621 B2
(45) Date of Patent: Aug. 9, 2022

(54) LATCHED TRANSISTOR DRIVING FOR HIGH FREQUENCY AC DRIVING OF EWOD ARRAYS

(71) Applicant: Nuclera Nucleics Ltd., Cambridge (GB)

(72) Inventors: Seth J. Bishop, Framingham, MA (US); Richard J. Paolini, Jr., Framingham, MA (US)

(73) Assignee: Nuclera Nucleics Ltd., Cambridge (GB)

( * ) Notice: Subject to any disclaimer, the term of this patent is extended or adjusted under 35 U.S.C. 154(b) by 0 days.

(21) Appl. No.: 17/179,439

(22) Filed: Feb. 19, 2021

(65) Prior Publication Data
US 2021/0256920 A1 Aug. 19, 2021

Related U.S. Application Data

(60) Provisional application No. 62/978,367, filed on Feb. 19, 2020.

(51) Int. Cl.
G09G 3/34 (2006.01)
G02B 26/00 (2006.01)
B01L 3/00 (2006.01)

(52) U.S. Cl.
CPC ........ *G09G 3/348* (2013.01); *B01L 3/502792* (2013.01); *G02B 26/005* (2013.01);
(Continued)

(58) Field of Classification Search
CPC ............ G02B 26/005; G02B 2207/115; B01L 3/502792; B01L 2400/0427; G09G 3/348
See application file for complete search history.

(56) References Cited

U.S. PATENT DOCUMENTS 3,813,519 A 5/1974 Jochin et al.
5,311,337 A 5/1994 McCartney, Jr.
(Continued)

FOREIGN PATENT DOCUMENTS

JP 2013076739 A 4/2013
TW 200916823 A 4/2009
(Continued)

OTHER PUBLICATIONS

Abdelgawad, Mohamed et al., "The Digital Revolution: A New Paradigm for Microfluidics", Advanced Materials, vol. 21, pp. 920-925,(2009). Jan. 1, 2009.
(Continued)

*Primary Examiner* — Priyank J Shah
(74) *Attorney, Agent, or Firm* — McCarter & English, LLP; David R. Burns

(57) ABSTRACT

Methods and systems for driving an active matrix electrowetting on dielectric device including thin-film-transistors to increase the switching frequency of the propulsion electrodes beyond what is typical for line-by-line active matrix driving. By using a latching circuit, it is possible to selectively switch specific propulsion (pixel) electrodes between an "on" and an "off" state, wherein a propulsion electrode in an "on" state can be driven by a time varying drive voltage on the top electrode that is a much higher frequency than is typically possible with amorphous silicon thin-film-transistor arrays. The faster drive frequency improves the performance of electrowetting devices, especially when used with aqueous droplets having a high ionic strength.

20 Claims, 8 Drawing Sheets

(52) U.S. Cl.
CPC ............... *B01L 2400/0427* (2013.01); *G09G 2300/0469* (2013.01)

(56) References Cited

U.S. PATENT DOCUMENTS

| | | | |
|---|---|---|---|
| 5,828,429 A | 10/1998 | Takemura | |
| 5,964,995 A | 10/1999 | Nikiforov et al. | |
| 6,352,758 B1 | 3/2002 | Huang et al. | |
| 6,565,727 B1 | 5/2003 | Shenderov | |
| 6,759,680 B1 | 7/2004 | Takemura | |
| 6,773,566 B2 | 8/2004 | Shenderov | |
| 6,911,132 B2 | 6/2005 | Pamula et al. | |
| 6,967,489 B2 | 11/2005 | Brooks et al. | |
| 6,977,033 B2 | 12/2005 | Becker et al. | |
| 7,052,244 B2 | 5/2006 | Fouillet et al. | |
| 7,053,009 B2 | 5/2006 | Conley, Jr. et al. | |
| 7,163,612 B2 | 1/2007 | Sterling et al. | |
| 7,215,306 B2 | 5/2007 | Lo | |
| 7,328,979 B2 | 2/2008 | Decre et al. | |
| 7,420,549 B2 | 9/2008 | Jacobson et al. | |
| 7,458,661 B2 | 12/2008 | Kim et al. | |
| 7,504,709 B2 | 3/2009 | Masuda et al. | |
| 7,531,072 B2 | 5/2009 | Roux et al. | |
| 7,547,380 B2 | 6/2009 | Velev | |
| 7,641,779 B2 | 1/2010 | Becker et al. | |
| 7,733,559 B2 | 6/2010 | Kawase et al. | |
| 7,767,069 B2 | 8/2010 | Lee et al. | |
| 7,902,680 B2 | 3/2011 | Tano et al. | |
| 7,976,795 B2 | 6/2011 | Zhou et al. | |
| 8,093,064 B2 | 1/2012 | Shah et al. | |
| 8,128,798 B2 | 3/2012 | Adachi et al. | |
| 8,159,644 B2 | 4/2012 | Takatori | |
| 8,173,000 B1 | 5/2012 | Hadwen et al. | |
| 8,187,864 B2 | 5/2012 | Wheeler et al. | |
| 8,319,759 B2 | 11/2012 | Jacobson et al. | |
| 8,349,276 B2 | 1/2013 | Pamula et al. | |
| 8,388,909 B2 | 3/2013 | Pollack et al. | |
| 8,409,417 B2 | 4/2013 | Wu | |
| 8,460,528 B2 | 6/2013 | Pollack et al. | |
| 8,514,479 B2 | 8/2013 | Bae et al. | |
| 8,525,966 B2 | 9/2013 | Takatori | |
| 8,529,743 B2 | 9/2013 | Kim et al. | |
| 8,547,111 B2 | 10/2013 | Hadwen et al. | |
| 8,587,513 B2 | 11/2013 | Ozawa | |
| 8,593,438 B2 | 11/2013 | Komatsu et al. | |
| 8,603,413 B2 | 12/2013 | Fouillet | |
| 8,653,832 B2 | 2/2014 | Hadwen et al. | |
| 8,764,958 B2 | 7/2014 | Wang | |
| 8,791,891 B2 | 7/2014 | Van Dijk et al. | |
| 8,810,882 B2 | 8/2014 | Heikenfeld et al. | |
| 8,815,070 B2 | 8/2014 | Wang et al. | |
| 8,834,695 B2 | 9/2014 | Wang et al. | |
| 8,858,772 B2 | 10/2014 | Crane et al. | |
| 8,926,811 B2 | 1/2015 | Wu | |
| 8,936,708 B2 | 1/2015 | Feiglin et al. | |
| 8,940,147 B1 | 1/2015 | Bartsch et al. | |
| 8,958,044 B2 | 2/2015 | Takatori | |
| 8,993,348 B2 | 3/2015 | Wheeler et al. | |
| 8,994,705 B2 | 3/2015 | Jacobson et al. | |
| 9,061,262 B2 | 6/2015 | Vann et al. | |
| 9,216,414 B2 | 12/2015 | Chu | |
| 9,266,076 B2 | 2/2016 | Kim et al. | |
| 9,458,489 B2 | 10/2016 | Lim et al. | |
| 9,458,543 B2 | 10/2016 | Hadwen | |
| 9,476,811 B2 | 10/2016 | Mudrik et al. | |
| 9,594,056 B2 | 3/2017 | Fobel et al. | |
| 9,610,582 B2 | 4/2017 | Kapur et al. | |
| 9,623,407 B2 | 4/2017 | Delamarche et al. | |
| 9,649,632 B2 | 5/2017 | Van Dam et al. | |
| 9,714,463 B2 | 7/2017 | White et al. | |
| 9,815,056 B2 | 11/2017 | Wu et al. | |
| 9,915,631 B2 | 3/2018 | Hoffmeyer et al. | |
| 9,983,169 B2 | 5/2018 | Bramanti | |
| 10,018,828 B2 | 7/2018 | Massard | |
| 10,486,156 B2 | 11/2019 | Campbell et al. | |
| 10,543,466 B2 | 1/2020 | Wu | |
| 10,646,454 B2 | 5/2020 | Liu et al. | |
| 10,882,042 B2 | 1/2021 | French | |
| 2006/0039823 A1 | 2/2006 | Yamakawa et al. | |
| 2007/0023292 A1 | 2/2007 | Kim et al. | |
| 2008/0124252 A1 | 5/2008 | Marchand et al. | |
| 2010/0032293 A1 | 2/2010 | Pollack et al. | |
| 2010/0225611 A1 | 9/2010 | Lee et al. | |
| 2012/0273702 A1 | 11/2012 | Culbertson et al. | |
| 2013/0161193 A1 | 6/2013 | Jacobs et al. | |
| 2015/0377831 A1 | 12/2015 | Wheeler et al. | |
| 2016/0199832 A1 | 7/2016 | Jamshidi et al. | |
| 2016/0312165 A1 | 10/2016 | Lowe, Jr. et al. | |
| 2017/0315090 A1 | 11/2017 | Wheeler et al. | |
| 2019/0210026 A1 | 7/2019 | Jebrail et al. | |
| 2020/0064705 A1 | 2/2020 | Kayal et al. | |
| 2020/0089035 A1 | 3/2020 | Tsai et al. | |
| 2020/0114135 A1 | 4/2020 | Paolini, Jr. et al. | |
| 2020/0347840 A1 | 11/2020 | Paolini, Jr. et al. | |
| 2020/0348576 A1 | 11/2020 | Visani et al. | |

FOREIGN PATENT DOCUMENTS

| | | |
|---|---|---|
| WO | 2007120241 A2 | 10/2007 |
| WO | 2017075295 A1 | 5/2017 |

OTHER PUBLICATIONS

Choi, Kihwan et al., "Digital Microfluidics", Annu. Rev. Anal. Chem. 5:413-40 (2012). Apr. 9, 2012.

Qi, Lin et al., "Mechanical-activated digital microfluidics with gradient surface wettability", Lab Chip, vol. 19, pp. 223-232, (2019). Dec. 4, 2019.

Subramanian, R. Shankar et al., "Motion of a Drop on a Solid Surface Due to a Wettability Gradient", Lanqmuir, vol. 12, pp. 11844-11849, (2005). Nov. 4, 2005.

Yu, Xi et al., "Surface Gradient Material: From Superhydrophobicity to Superhydrophilicity", Langmuir, vol. 22, pp. 4483-4486, (2006). Apr. 7, 2006.

Ito, Yoshihiro et al., "The Movement of a Water Droplet on a Gradient Surface Prepared by Photodegradation", Langmuir, vol. 23, pp. 1845-1850, (2007). Dec. 22, 2006.

Bhattacharjee, Biddut, "Study of Droplet Splitting in an Electrowetting Based Digital Microfluidic System", The University of British Columbia, Sep. 2012. Sep. 1, 2012.

Cho, Sung Kwon et al., "Creating, Transporting, Cutting, and Merging Liquid Droplets by Electrowetting-Based Actuation for Digital Microfluidic Circuits", Journal of Microelectromechanical Systems, vol. 12, No. 1, Feb. 2003. Feb. 1, 2003.

Nikapitiya, N. Y. Jagath B. et al., "Accurate, consistent, and fast droplet splitting and dispensing in electrowetting on dielectric digital microfluidics", Mirco and Nano Systems Letters, vol. 5, No. 24, Jun. 2017. Jun. 16, 2017.

Hadwen, B. et al., "Programmable large area digital microfluidic array with integrated droplet sensing for bioassays", Lab on a Chip, Issue 18, (2012). May 22, 2012.

Cooney, Christopher G. et al., "Electrowetting droplet microfluidics on a single planar surface", Microfluisics and Nanofluidics, vol. 2, Issue 5, pp. 435-446 (Sep. 2006). Sep. 1, 2006.

Fouillet, Y. et al., "EWOD Digital Microfluidics for Lab on a Chip", International Conference on Nanochannels, Microchannels, and Minichannels, Paper No. ICNMM2006-96020, pp. 1255-1264, (Sep. 2008). Sep. 15, 2008.

Nemani, Srinivasa Kartik et al., "Surface Modification of Polymers: Methods and Applications", Advanced Materials Interfaces, vol. 5, Issue 24, p. 1801247, Dec. 21, 2018. Dec. 21, 2018.

Hitzbleck, Martina et al., "Reagents in microfluidics: an 'in' and 'out' challenge", Chem. Soc. Rev., vol. 42, p. 8494, (2013). Mar. 27, 2013.

Walker, Shawn W. et al., "Modeling the Fluid Dynamics of Electro-Wetting On Dielectric (EWOD)", Journal of Microelectromechanical Systems, vol. 15, No. 4, pp. 986-1000, (Aug. 2006). Aug. 2006.

(56) References Cited

OTHER PUBLICATIONS

Li, Yiyan et al., "Improving the performance of electrowetting on dielectric microfluidics using piezoelectric top plate control". Sensors and Actuators B, vol. 229, pp. 63-74 (2016). 2016.

Barbulovic-Nad, Irena et al., "Digital microfluidics for cell-based assays", Lab Chip, vol. 8, pp. 519-526 (2008). Feb. 25, 2008.

Newman, Sharon et al., "High density DNA storage library via dehydration with digital microfluidic retrieval", Nature Communications, vol. 10, No. 1706 (2019). Apr. 12, 2019.

Dhindsa, Manjeet et al., "Virtual electrowetting channels: electronic liquid transport with continuous channel functionality", Lab on a Chip, Issue 7, pp. 832-836, (2010). Feb. 26, 2010.

LATCHED TRANSISTOR DRIVING FOR HIGH FREQUENCY AC DRIVING OF EWOD ARRAYS

RELATED APPLICATIONS

This application claims priority to U.S. Provisional Patent Application No. 62/978,367, filed Feb. 19, 2020. All patents, applications, and publications disclosed herein are incorporated by reference in their entireties.

BACKGROUND

Digital microfluidic (DMF) devices use independent electrodes to propel, split, and join droplets in a confined environment, thereby providing a "lab-on-a-chip." Digital microfluidic devices have been used to actuate a wide range of volumes (nL to µL) and are alternatively referred to as electrowetting on dielectric, or "EWoD," to further differentiate the method from competing microfluidic systems that rely on electrophoretic flow and/or micropumps. In electrowetting, a continuous or pulsed electrical signal is applied to a droplet, leading to switching of its contact angle. Liquids capable of electrowetting a hydrophobic surface typically include a polar solvent, such as water or an ionic liquid, and often feature ionic species, as is the case for aqueous solutions of electrolytes. A 2012 review of the electrowetting technology was provided by Wheeler in "Digital Microfluidics," *Annu. Rev. Anal. Chem.* 2012, 5:413-40. The technique allows sample preparation, assays, and synthetic chemistry to be performed with tiny quantities of both samples and reagents. In recent years, controlled droplet manipulation in microfluidic cells using electrowetting has become commercially viable, and there are now products available from large life science companies, such as Oxford Nanopore.

Typically, EWoD devices include a stack of an electrode, an insulating dielectric layer, and a hydrophobic layer providing a working surface. A droplet is placed on the working surface, and the electrode, once actuated, can cause the droplet to deform and wet or de-wet from the surface depending on the applied voltage. Most of the literature reports on EWoD involve so-called "direct drive" devices (a.k.a. "segmented" devices), whereby ten to several hundred electrodes are directly driven with a controller. While segmented devices are easy to fabricate, the number of electrodes is limited by space and driving constraints. Accordingly, it is not possible to perform massive parallel assays, reactions, etc. in direct drive devices. In comparison, "active matrix" devices (a.k.a. active matrix EWoD, a.k.a. AM-EWoD) devices can have many thousands, hundreds of thousands or even millions of addressable electrodes. In AM-EWoD devices electrodes are typically switched by thin-film transistors (TFTs) and droplet motion is programmable so that AM-EWoD arrays can be used as general purpose devices that allow great freedom for controlling multiple droplets and executing simultaneous analytical processes.

The electrodes of an AM-EWoD are typically switched by thin-film transistors (TFTs), although electro-mechanical switches may also be used. TFT based thin film electronics may be used to control the addressing of voltage pulses to an EWoD array by using circuit arrangements very similar to those employed in AM display technologies. TFT arrays are highly desirable for this application, due to having thousands of addressable pixels, thereby allowing mass parallelization of droplet procedures. Driver circuits can be integrated onto the AM-EWoD array substrate, and TFT-based electronics are well suited to the AM-EWoD application. TFTs can be made using a wide variety of semiconductor materials. A common material is silicon. The characteristics of a silicon-based TFT depend on the silicon's crystalline state, that is, the semiconductor layer can be either amorphous silicon (a-Si), microcrystalline silicon, or it can be annealed into low-temperature polysilicon (LTPS). TFTs based on a-Si are cheap to produce so that relatively large substrate areas can be manufactured at relatively low cost. More exotic materials, such as metal oxides may also be used to fabricate thin film transistor arrays but the fabrication costs of such devices is typically high because of the specialized equipment needed to handle/deposit the metal oxides.

In traditional applications where TFTs are used to switch display pixels, the frame rates are in the order of about 100 Hz. However, when DC or low frequency AC signals are used for EWoD then ions can diffuse through the top dielectric layers. When ions reach the underlying TFT array with metal lines and voltages between them then a range of different detrimental electrochemical reactions will occur. Several different failure mechanisms for a-Si TFT EWoD devices driven at 100 Hz have been seen. It has also reported that EWoD arrays tends to slow down with use for low frequency driving. The mechanism of the slow-down is not understood, but it does not occur with high frequency driving. Hence, AM-EWoD application requires a frame rate that is faster than is used in display applications.

For active matrix devices, the drive signals are often output from a controller to gate and scan drivers that, in turn, provide the required current-voltage inputs to active the various TFT in the active matrix. However, controller-drivers capable of receiving, e.g., image data, and outputting the necessary current-voltage inputs to active the TFTs are commercially available. Most active matrices of thin-film-transistors are drive with line-at-a-time (a.k.a., line-by-line) addressing, which is used in the vast majority of LCD displays. Line-at-a-time addressing is used in all traditional a-Si TFT arrays due to low electron mobility and large TFT size, which means circuits cannot effectively be used in a-Si TFT pixels. Metal oxide and LTPS TFTs have much higher mobility than a-Si TFTs, but even these cannot reach frame rates much above 200 Hz with line-at-a-time addressing due to capacitive loading on gate and source lines.

An alternative method of driving TFT arrays for electrowetting applications is known as memory-in-pixel. This method typically combines high-performance LTPS TFTs memory and drive circuits fabricated onto the backplane. Memory-in-pixel driving uses a first signal to put a pixel into an "ON" state, whereupon a different integrated circuit provides a drive signal directly to the pixel until a separate control signal is received to move the pixel to an "OFF" state, thus disabling the drive signal. The advantage to memory-in-pixel is that voltage pulses do not need to be applied to long gate and source lines several times per second. This results in significant power reduction. In advanced memory-in-pixel technologies, very high quality LTPS TFTs are used to incorporate memory and oscillator circuits at each pixel and allow high frequency (1 kHz) EWoD operation. However, the memory-in-pixel with oscillator technique is very expensive to fabricate because of the many additional masks required and deposition steps required. In addition, because of the extra processing steps, the yield decreases substantially beyond normal "simple" AM-TFT designs with a-Si. Such processes are not suitable for use AM-TFT panels because the lower yield due to the extra steps is further exacerbated by the number of opportunities for failure as the number of pixels grows exponentially with increased diagonal length.

SUMMARY OF INVENTION

In a first aspect, there is provided an active matrix electrowetting on dielectric (AM-EWoD) system. The system includes a processing unit, a pixel array, a plurality of matrix gate drivers, a plurality of matrix source drivers, a power source, a top plane common electrode disposed in opposition to the pixel array, and a controller. Each pixel of the array comprises a pixel electrode, a pixel transistor comprising a source, a drain, and a gate, the pixel transistor source operably connected to the pixel electrode, and the pixel transistor drain operably connected to a matrix power rail, a latching circuit operably connected to the pixel transistor gate, a matrix gate line, a matrix source line, and the matrix power rail, the latching circuit being configured to latch the pixel transistor in an on state or an off state controlled by a state of the matrix gate line and a state of the matrix source line. Each matrix gate driver is operably connected to a matrix gate line. Each matrix source driver is operably connected to a matrix source line. The power source is operably connected to the plurality of matrix power rails. The top plane common electrode is operably connected to a top plane common electrode driver and configured to provide a time-variable voltage. The controller is operably connected to the matrix gate driver, matrix source driver, and the top plane common electrode driver, the controller being configured to receive instructions from the processing unit to latch pixel transistors in an on state or an off state. In some embodiments, the latching circuit comprises a latch transistor comprising a source, a drain, and a gate, and the latch transistor is operably connected to the matrix gate line and matrix source line, while a latching capacitor is operably connected to the pixel gate, the drain of the latch transistor, and the matrix power rail. In a non-exclusive embodiment, the pixel transistors and the latch transistors are thin film transistors (TFT), for example amorphous silicon thin film transistors (a-Si TFT). In another non-exclusive embodiment, the top plane common electrode driver is configured to operate at a frequency in the range from at least 250 Hz to at most 5 kHz, for example from at least 500 Hz to at most 1.5 kHz or at least 750 Hz to at most 1.25 kHz. The top plane common electrode driver may be configured to operate at a frequency higher than or equal to the latch driving frequency. The controller may include a first sub-controller operably connected to the matrix gate drivers and matrix source drivers, and a second sub-controller operably connected to the top plane common electrode driver.

In a second aspect, there is provided a method of driving an active matrix electrowetting on dielectric (AM-EWoD) system. The system includes a processing unit, a pixel array, a plurality of matrix gate drivers, a plurality of matrix source drivers, a power source, a top plane common electrode disposed in opposition to the pixel array, and a controller. Each pixel of the array comprises a pixel electrode, a pixel transistor comprising a source, a drain, and a gate, the pixel transistor source operably connected to the pixel electrode, and the pixel transistor drain operably connected to a matrix power rail, a latching circuit operably connected to the pixel transistor gate, a matrix gate line, a matrix source line, and the matrix power rail, the latching circuit being configured to latch the pixel transistor in an on state or an off state controlled by a state of the matrix gate line and a state of the matrix source line. Each matrix gate driver is operably connected to a matrix gate line. Each matrix source driver is operably connected to a matrix source line. The power source is operably connected to the plurality of matrix power rails. The top plane common electrode is operably connected to a top plane common electrode driver and configured to provide a time-variable voltage. The controller is operably connected to the matrix gate driver, matrix source driver, and the top plane common electrode driver, the controller being configured to receive instructions from the processing unit to latch pixel transistors in an on state or an off state. The method includes receiving input instructions into the processing unit, (the input instructions relating to a droplet operation to be performed by the AM-EWoD), outputting matrix gate line and matrix source line selecting instructions from the processing unit to the controller, outputting a matrix gate line signal from the controller to the driver of a matrix gate line and a matrix source line signal from the controller to the driver of a matrix source line, to switch the latching circuit of at least one pixel, and outputting a time-variable top common electrode signal from the top plane common electrode driver to the top plane common electrode driver, to drive latched on pixels. In some embodiments, the latching circuit comprises a latch transistor comprising a source, a drain, and a gate, and the latch transistor is operably connected to the matrix gate line and matrix source line, while a latching capacitor is operably connected to the pixel gate, the drain of the latch transistor, and the matrix power rail. In one non-exclusive embodiment, the pixel transistors and latch transistors are thin film transistors (TFT), for example amorphous silicon thin film transistors (a-Si TFT). In another non-exclusive embodiment, the top plane common electrode driver is configured to operate at a frequency in the range from at least 250 Hz to at most 5 kHz, for example from at least 500 Hz to at most 1.5 kHz or at least 750 Hz to at most 1.25 kHz. The top plane common electrode driver may be configured to operate at a frequency higher than or equal to the latch driving frequency. The controller may include a first sub-controller operably connected to the matrix gate drivers and matrix source drivers, and a second sub-controller operably connected to the top plane common electrode driver.

BRIEF DESCRIPTION OF DRAWINGS

FIG. 4A is a configuration of the pixel of FIG. 3 with both the pixel transistor and latch transistor switched on. FIG. 4C is the configuration with the pixel transistor switched off and the latch transistor switched on.

DEFINITIONS

Figure 1A:
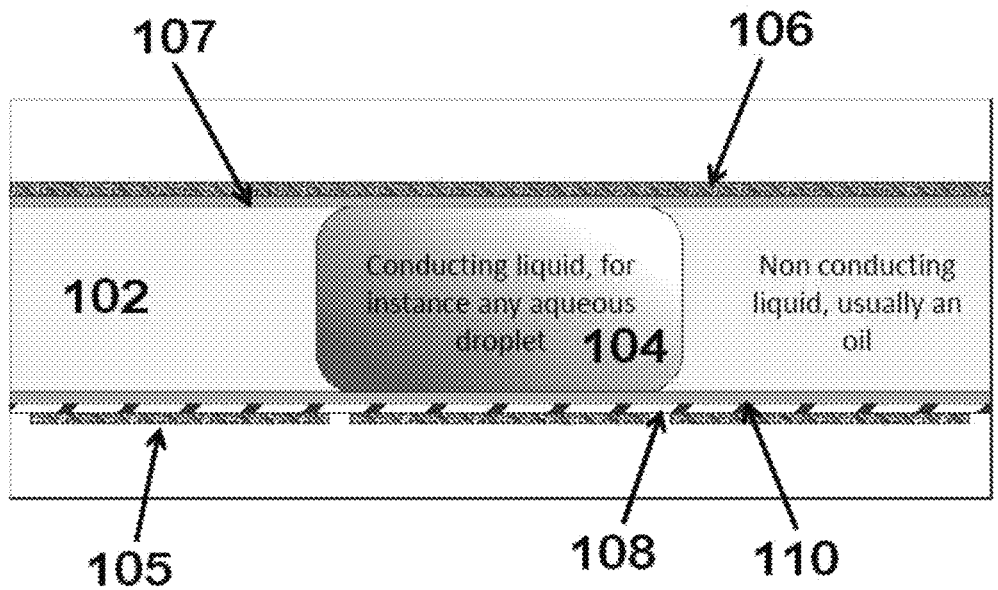
FIG. 1A is a diagrammatic cross-section of the cell of an example EWoD device.

Unless otherwise noted, the following terms have the meanings indicated.

"Actuate" with reference to one or more electrodes means effecting a change in the electrical state of the one or more electrodes which, in the presence of a droplet, results in a manipulation of the droplet.

"Droplet" means a volume of liquid that electrowets a hydrophobic surface and is at least partially bounded by carrier fluid. For example, a droplet may be completely surrounded by carrier fluid or may be bounded by carrier fluid and one or more surfaces of an EWoD device. Droplets may take a wide variety of shapes; non-limiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more working surface of an EWoD device. Droplets may include typical polar fluids such as water, as is the case for aqueous or non-aqueous compositions, or may be mixtures or emulsions including aqueous and non-aqueous components. The specific composition of a droplet is of no particular relevance, provided that it electrowets a hydrophobic working surface. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include one or more reagent, such as water, deionized water, saline solutions, acidic solutions, basic solutions, detergent solutions and/or buffers. Other examples of droplet contents include reagents, such as a reagent for a biochemical protocol, a nucleic acid amplification protocol, an affinity-based assay protocol, an enzymatic assay protocol, a gene sequencing protocol, a protein sequencing protocol, and/or a protocol for analyses of biological fluids. Further example of reagents include those used in biochemical synthetic methods, such as a reagent for synthesizing oligonucleotides finding applications in molecular biology and medicine, and/or one more nucleic acid molecules. The oligonucleotides may contain natural or chemically modified bases and are most commonly used as antisense oligonucleotides, small interfering therapeutic RNAs (siRNA) and their bioactive conjugates, primers for DNA sequencing and amplification, probes for detecting complementary DNA or RNA via molecular hybridization, tools for the targeted introduction of mutations and restriction sites in the context of technologies for gene editing such as CRISPR-Cas9, and for the synthesis of artificial genes.

"Droplet operation" means any manipulation of one or more droplets on a microfluidic device. A droplet operation may, for example, include: loading a droplet into the microfluidic device; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a microfluidic device; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles.

"Gate driver" is a power amplifier that accepts a low-power input from a controller, for instance a microcontroller integrated circuit (IC), and produces a high-current drive input for the gate of a high-power transistor such as a TFT. "Source driver" is a power amplifier producing a high-current drive input for the source of a high-power transistor. "Top plane common electrode driver" is a power amplifier producing a high-current drive input for the top plane electrode of an EWoD device.

"Nucleic acid molecule" is the overall name for DNA or RNA, either single- or double-stranded, sense or antisense. Such molecules are composed of nucleotides, which are the monomers made of three moieties: a 5-carbon sugar, a phosphate group and a nitrogenous base. If the sugar is a ribosyl, the polymer is RNA (ribonucleic acid); if the sugar is derived from ribose as deoxyribose, the polymer is DNA (deoxyribonucleic acid). Nucleic acid molecules vary in length, ranging from oligonucleotides of about 10 to 25 nucleotides which are commonly used in genetic testing, research, and forensics, to relatively long or very long prokaryotic and eukaryotic genes having sequences in the order of 1,000, 10,000 nucleotides or more. Their nucleotide residues may either be all naturally occurring or at least in part chemically modified, for example to slow down in vivo degradation. Modifications may be made to the molecule backbone, e.g. by introducing nucleoside organothiophosphate (PS) nucleotide residues. Another modification that is useful for medical applications of nucleic acid molecules is 2' sugar modifications. Modifying the 2' position sugar is believed to increase the effectiveness of therapeutic oligonucleotides by enhancing their target binding capabilities, specifically in antisense oligonucleotides therapies. Two of the most commonly used modifications are 2'-O-methyl and the 2'-Fluoro.

When a liquid in any form (e.g., a droplet or a continuous body, whether moving or stationary) is described as being "on", "at", or "over an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a microfluidic device, it should be understood that the droplet is arranged on the device in a manner which facilitates using the device to conduct one or more droplet operations on the droplet, the droplet is arranged on the device in a manner which facilitates sensing of a property of or a signal from the droplet, and/or the droplet has been subjected to a droplet operation on the droplet actuator.

"Each," when used in reference to a plurality of items, is intended to identify an individual item in the collection but does not necessarily refer to every item in the collection. Exceptions can occur if explicit disclosure or context clearly dictates otherwise.

DETAILED DESCRIPTION

In one aspect, the present invention provides a novel method of latched transistor driving in AM-EWoD arrays. The method may be carried out with simple design, standard low mobility a-Si TFTs to achieve the same results as high-frequency memory-in-pixel techniques. Amorphous silicon TFTs are much lower cost than LTPS and are routinely used to drive large LC-TVs with panel size more than 40" in diagonal, so large area yield is not an issue. Latched driving accommodates higher EWoD frame rates by using persistent latched TFTs and a top plane electrode driver that is capable of driving the top plane electrode at high frequency, e.g., 1 kHz or even higher. The electrode of each pixel is connected to a pixel transistor, and the gate of the pixel transistor is connected to a latching circuit. Scanning the matrix gate lines and source lines switches the pixel transistor gate of each pixel either on or off, across the entire array of pixels of the matrix. The latching circuit maintains the pixel transistor in that state for a duration of time, until a new scan of the gate and source lines turns the pixel transistor gates off or to a new pattern of on/off. After the desired gate pattern is latched, the top plane common electrode is used to drive the entire pixel array at once. Only the latched on pixels are driven. In this way the driving of TFT hardware at higher frequencies is greatly simplified at limited extra cost.

Traditional Gate Line Addressing

A typical AM-EWoD device consists of a thin film transistor backplane with an exposed array of regularly shaped electrodes that may be arranged as pixels. The pixels may be controllable as an active matrix, thereby allowing for the manipulation of sample droplets. The array is usually coated with a dielectric material, followed by a coating of hydrophobic material. The fundamental operations of a typical EWoD device are illustrated in the sectional images of FIG. 1A-1C. FIG. 1A shows a diagrammatic cross-section of the cell of an example traditional EWoD device where droplet 104 is surrounded on the sides by carrier fluid 102 and sandwiched between top hydrophobic layer 107 and bottom hydrophobic layer 110. Propulsion electrodes 105 can be driven directly, e.g., by separate control circuits, or the electrodes can be switched by transistor arrays arranged to be driven with data (source) and gate (select) lines, much like an active matrix in liquid crystal displays (LCDs), resulting in what is known as active matrix (AM) EWOD. Typical cell spacing is usually in the range of about 120 µm to about 500 µm.

Typically a dielectric layer 108 is deposited over the propulsion electrodes 105 as well as the associated gate and data lines. The dielectric 108 should be thin enough and have a dielectric constant compatible with low voltage AC driving, such as available from conventional image controllers for LCD displays. For example, the dielectric layer 108 may comprise a layer of approximately 20-40 nm $SiO_2$ topped over-coated with 200-400 nm plasma-deposited silicon nitride. Alternatively, the dielectric layer 108 may comprise atomic-layer-deposited $Al_2O_3$ between 5 and 500 nm thick, preferably between 150 and 350 nm thick.

The hydrophobic layer 107/110 can be constructed from one or a blend of fluoropolymers, such as PTFE (polytetrafluoroethylene), FEP (fluorinated ethylene propylene), PVF (polyvinylfluoride), PVDF (polyvinylidene fluoride), PCTFE (polychlorotrifluoroethylene), PFA (perfluoroalkoxy polymer), FEP (fluorinated ethylene-propylene), ETFE (polyethylenetetrafluoroethylene), and ECTFE (polyethylenechlorotrifluoroethylene). Commercially available fluoropolymers Teflon® AF (Sigma-Aldrich, Milwaukee, Wis.) and FluoroPel™ coatings from Cytonix (Beltsville, Md.), which can be spin coated over the dielectric layer 408. An advantage of fluoropolymer films is that they can be highly inert and can remain hydrophobic even after exposure to oxidizing treatments such as corona treatment and plasma oxidation. Coatings having higher contact angles may be fabricated from one or more superhydrophobic materials. Contact angles on superhydrophobic materials typically exceed 150°, meaning that only a small percentage of a droplet base is in contact with the surface. This imparts an almost spherical shape to the water droplet. Certain fluorinated silanes, perfluoroalkyls, perfluoropolyethers and RF plasma-formed superhydrophobic materials have found use as coating layers in electrowetting applications and render it relatively easier to slide along the surface. Some types of composite materials are characterized by chemically heterogeneous surfaces where one component provides roughness and the other provides low surface energy so as to produce a coating with superhydrophobic characteristics. Biomimetic superhydrophobic coatings rely on a delicate micro or nano structure for their repellence, but care should be taken as such structures tend to be easily damaged by abrasion or cleaning.

While it is possible to have a single layer for both the dielectric and hydrophobic functions, such layers typically require thick inorganic layers (to prevent pinholes) with resulting low dielectric constants, thereby requiring more than 100V for droplet movement. To achieve low voltage actuation, it is usually better to have a thin inorganic layer for high capacitance and to be pinhole free, topped by a thin organic hydrophobic layer. With this combination it is possible to have electrowetting operation with voltages in the range +/−10 to +/−50V, which is in the range that can be supplied by conventional TFT arrays.

Figure 1B:
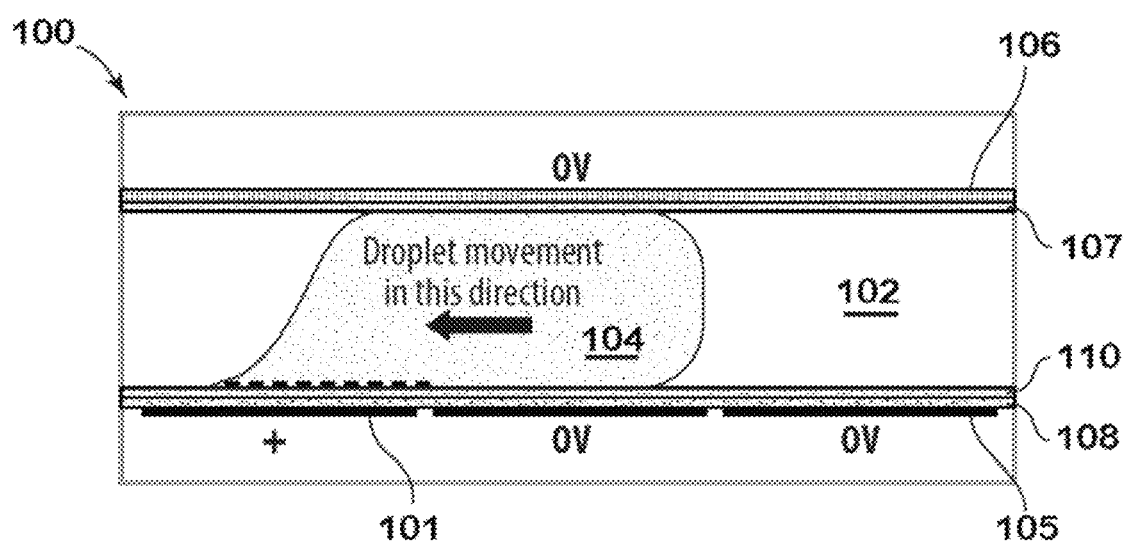
FIG. 1B illustrates EWoD operation with DC Top Plane.
Figure 1C:
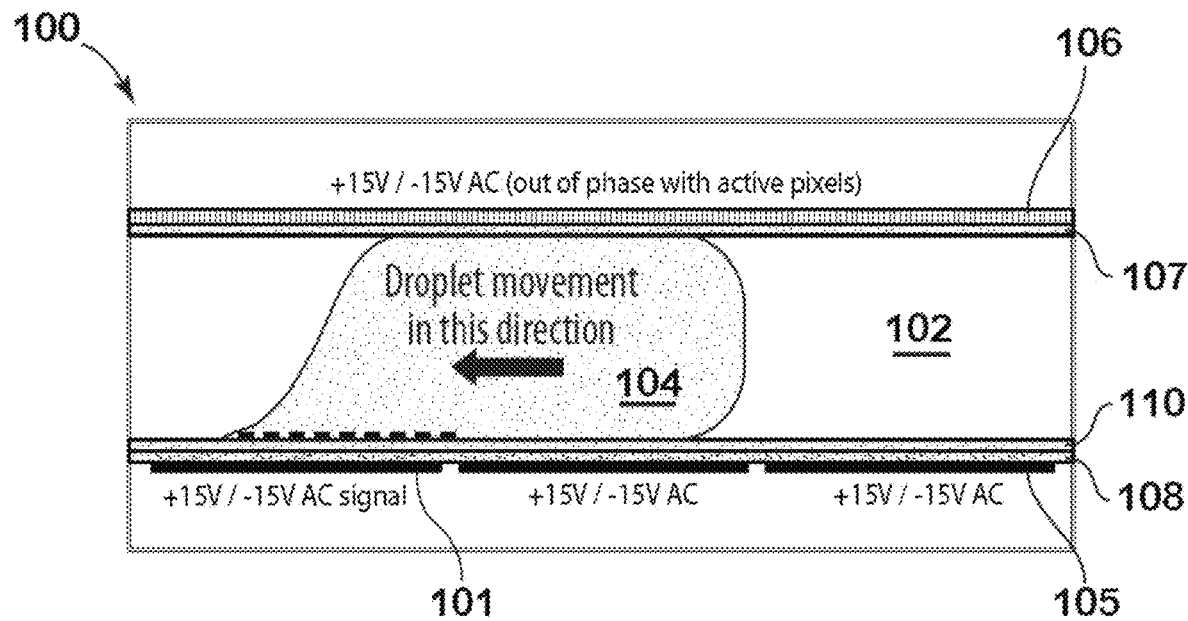
FIG. 1C illustrates EWoD operation with TPS.

In reference to the methods disclosed herein, there are two "modes" of driving EWoDs: "DC Top Plane" and "Top Plane Switching (TPS)". FIG. 1B illustrates EWoD operation in DC Top Plane mode, where the top plane electrode 106 is set to a potential of zero volts. As a result, the voltage applied across the cell is the voltage on the active pixel, that is, pixel 101 having a different voltage to the top plane so that conductive droplets are attracted to the electrode. This limits driving voltages in the EWoD cell to about ±15 V because in a-Si TFTs the maximum voltage is in the range from about 15 V to about 20 V due to TFT electrical instabilities under high voltage operation. The alternative, Top-Plane Switching is shown in FIG. 1C, in which the driving voltage is effectively doubled to ±30 V by powering the top electrode out of phase with active pixels, such that the top plane voltage is additional to the voltage supplied by the TFT.

Figure 1D:
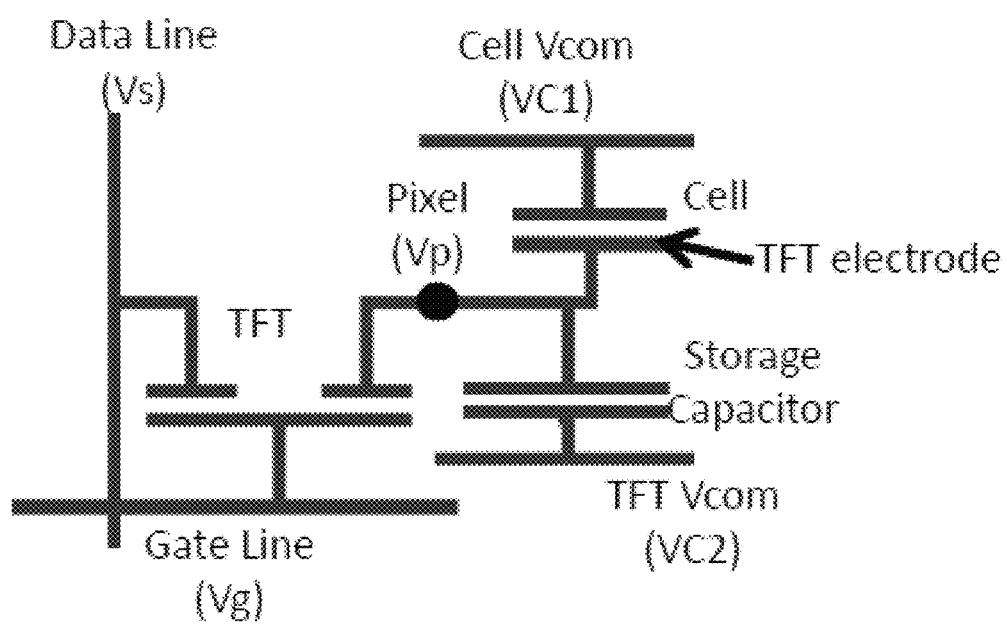
FIG. 1D is a schematic diagram of a TFT connected to a gate line, a source line, and a propulsion electrode.

Amorphous silicon TFT plates usually have only one transistor per pixel. As illustrated in in FIG. 1D, the transistor is connected to a gate line, a data line, and a propulsion electrode. When there is large enough positive voltage on the TFT gate then there is low impedance between the data line and pixel (Vg "ON"), so the voltage on the data line is transferred to the electrode of the pixel. When there is a negative voltage on the TFT gate then the TFT is high impedance and voltage is stored on the pixel storage capacitor and not affected by the voltage on the data line as the other pixels are addressed (Vg "OFF"). Ideally, the TFT should act as a digital switch. In practice, there is still a certain amount of resistance when the TFT is in the "ON" setting, so the pixel takes time to charge. Additionally, voltage can leak from Vs to Vp when the TFT is in the "OFF" setting, causing cross-talk. Increasing the capacitance of the storage capacitor $C_s$ reduces cross-talk, but at the cost of rendering the pixels harder to charge.

As mentioned in the background, alternative thin film materials for constructing transistors include low-temperature polymorphous silicon and metal oxide materials, such as tungsten oxide, tin oxide, indium oxide, and zinc oxide. In metal oxide applications, a channel formation region is formed for each transistor using such metal oxide materials, allowing faster switching of higher voltages. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Suitable active matrix backplanes including LTPS materials are available from manufacturers such as Sharp/Foxconn. Suitable active matrix backplanes including metal oxide semiconductors are available from manufacturers such as LG and BOE.

Figure 2:
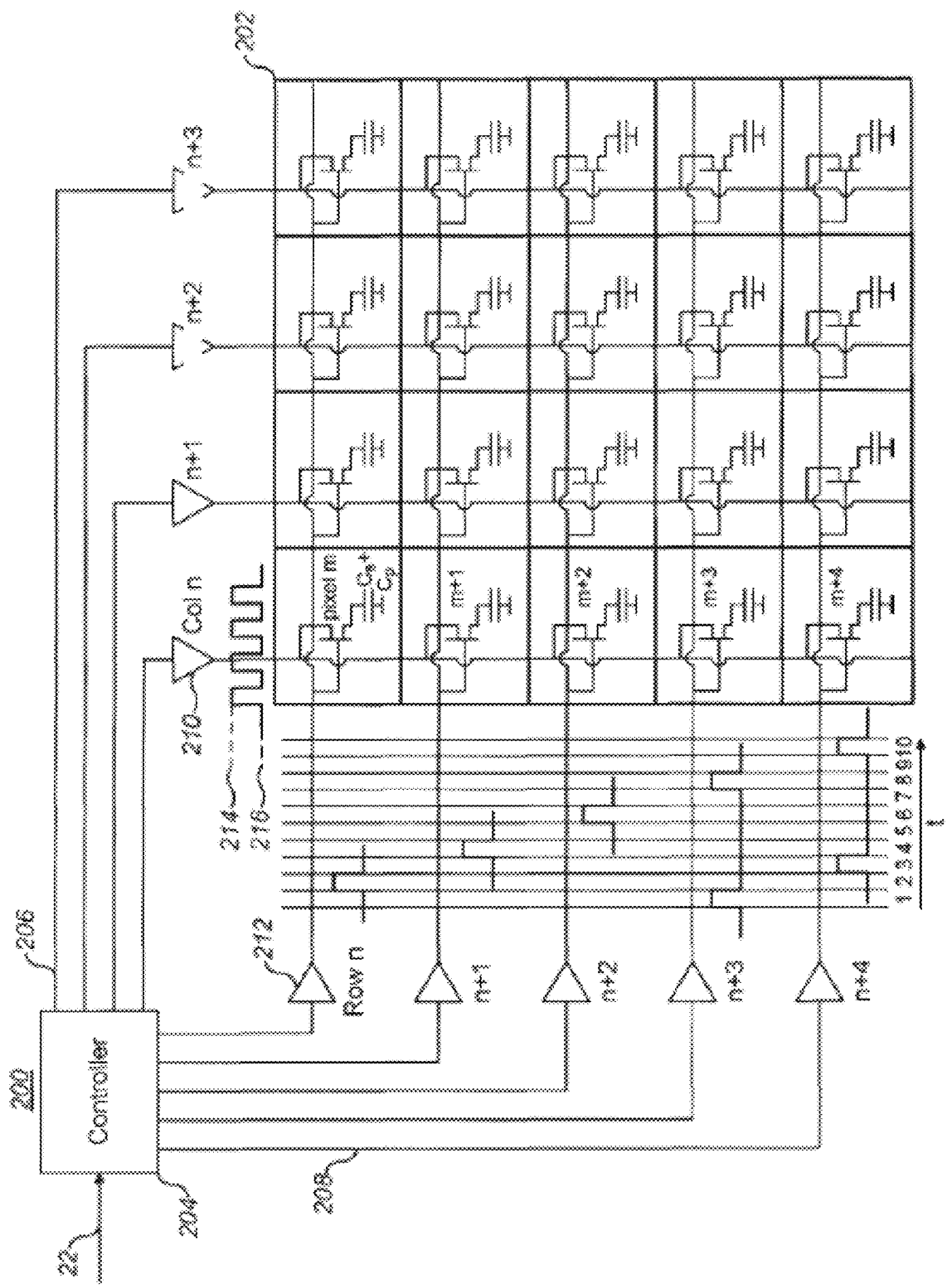
FIG. 2 is a diagrammatic view of an exemplary driving system for controlling droplet operation by an AM-EWoD propulsion electrode array.

FIG. 2 is a diagrammatic view of an exemplary driving system 200 for controlling droplet operation by an AM-EWoD propulsion electrode array 202. The AM-EWoD driving system 200 may be in the form of an integrated circuit adhered to a support plate. The elements of the EWoD device are arranged in the form of a matrix having a plurality of data lines and a plurality of gate lines. Each element of the matrix contains a TFT of the type illustrated in FIG. 1D for controlling the electrode potential of a corresponding electrode, and each TFT is connected to one of the gate lines and one of the data lines. The electrode of the element is indicated as a capacitor $C_p$. The storage capacitor $C_s$ is arranged in parallel with $C_p$ and is not separately shown in FIG. 2.

The controller shown comprises a microcontroller 204 including control logic and switching logic. It receives input data relating to droplet operations to be performed from the input data lines 22. The microcontroller has an output for each data line of the EWoD matrix, providing a data signal. A data signal line 206 connects each output to a data line of the matrix. The microcontroller also has an output for each gate line of the matrix, providing a gate line selection signal. A gate signal line 208 connects each output to a gate line of the matrix. A data line driver 210 and a gate line driver 212 is arranged in each data and gate signal line, respectively. The figure shows the signals lines only for those data lines and gate lines shown in the figure. The gate line drivers may be integrated in a single integrated circuit. Similarly, the data line drivers may be integrated in a single integrated circuit. The integrated circuit may include the complete gate driver assembly together with the microcontroller. The integrated circuit may be integrated on a support plate of the AM-EWoD device. The integrated circuit may include the entire AM-EWoD device driving system.

The data line drivers provide the signal levels corresponding to a droplet operation. The gate line drivers provide the signals for selecting the gate line of which the electrodes are to be actuated. A sequence of voltages of one of the data line drivers 210 is shown in FIG. 2. As discussed previously, when there is large enough positive voltage on the gate line then there is low impedance between the data line and pixel, so the voltage on the data line is transferred to the pixel. When there is a negative voltage on the TFT gate then the TFT is high impedance and voltage is stored on the pixel capacitor and not affected by the voltage on the data line. If no movement is needed, or if a droplet is meant to move away from a propulsion electrode, then 0 V will be applied to that (non-target) propulsion electrode. If a droplet is meant to move toward a propulsion electrode, an AC voltage will be applied to that (target) propulsion electrode. The figure shows four columns labelled n to n+3 and five rows labelled n to n+4.

As illustrated in FIG. 2, traditional AM-EWoD cells use line-at-a-time addressing, in which one gate line n is high while all the others are low. The signals on all of the data lines are then transferred to all of the pixels in row n. At the end of the line time gate line n signal goes low and the next gate line n+1 goes high, so that data for the next line is transferred to the TFT pixels in row n+1. This continues with all of the gate lines being scanned sequentially so the whole matrix is driven. This is the same method that is used in almost all AM-LCDs, such as mobile phone screens, laptop screens and LCD-TVs, whereby TFTs control the voltage maintained across the liquid crystal layer, and in AM-EPDs (electrophoretic displays).

One limitation on the speed at which a AM-TFT can be driven is the time that is required for each pixel electrode to be charged sufficiently to induce a visible state change. In the case of an ideal driving signal, a Maximum Line Time (MLT) can be calculated, which is a function of the Frame Time (FT), the Frame Rate (FR), and the Number of Gate Lines (n):

Frame Time (FT)=1/FR,

MLT=FT/n

For example, the MLT for an EWoD with gate 500 lines driven at 100 Hz would be 1/100/500=20 μs. In practice, gate and source lines are further characterized by RC time constants that depend on the TFT design and the size of the array. Typically, the RC time constants resulting in TFT switching that is slower than the ideal line time. Accordingly, an additional 2 to 3 μs are typically needed between one gate line being switched "OFF" and the next one "ON", resulting in real times for pixel charging typically 2 to 3 μs shorter than the MLT calculated for a given Frame Rate. Typically, EPDs and LCDs typically operate at frame rates between 60 and 120 Hz. A rate of 100 Hz may be taken for an example in estimating line times. Furthermore, AM-TFT displays often have about one thousand gate lines. Using these figures, a frame rate 100 Hz results in a frame time of 10 ms, and 1000 gate lines result in a maximum line time available of 10 ms/1000=10 µs.

Listed in Table I are EWoD frequencies, TFT frame rates and MLTs for TFT panels with different numbers of gate lines. Importantly, the TFT frame rate is twice the EWoD frequency because a complete EWoD cycle needs both a positive and negative pulse. MLTs greater than 8 µs are in bold, meaning that a simple a-Si TFT array using line-at-a-time addressing is likely able to drive them while retaining a satisfactory performance. MLTs shorter than 8 µs are in italics, meaning that a-Si TFTs with standard driving is unlikely to achieve high EWoD frequencies:

TABLE I

Maximum Line Times for different EWoD frequencies

| EWoD Frequency (Hz) | TFT Frame Rate (Hz) | Frame Time (ms) | Maximum Line Time (No. of Scan Lines) | | | |
|---|---|---|---|---|---|---|
| | | | (100) (µs) | (200) (µs) | (500) (µs) | (1000) (µs) |
| 50 | 100 | 10.0 | 100.00 | 50.0 | 20.0 | 10.0 |
| 100 | 200 | 5.0 | 50.0 | 25.0 | 10.0 | *5.0* |
| 200 | 400 | 2.5 | 25.0 | 12.5 | *5.0* | *2.5* |
| 400 | 800 | 1.3 | 12.5 | *6.3* | *2.5* | *1.3* |
| 600 | 1200 | 0.8 | 8.3 | *4.2* | *1.7* | *0.8* |
| 800 | 1600 | 0.6 | *6.3* | *3.1* | *1.3* | *0.6* |
| 1000 | 2000 | 0.5 | *5.0* | *2.5* | *1.0* | *0.5* |

Thus, as shown in Table I, for small arrays, i.e., 200 scan lines it is possible to drive the array at greater than 200 Hz, but even 200 Hz driving quickly becomes out of the question for larger arrays, such as 500 scan lines or larger. For the most, part it is simply not feasible to use line-at-a-time addressing at 1000 Hz.

Latched Transistor Driving

As illustrated above, in traditional line-at-a-time addressing methods each row is individually driven, so the number of gate periods is always equal to the number of gate lines. This creates difficulty in operating EWoDs with a-Si TFTs when the arrays are driven at high frame rates because the a-Si TFTs and drivers are not capable of scanning the matrix source and gate lines at high frequencies and reaching an adequate state of charge for the pixel electrodes. However, there are substantial benefits to driving electrowetting displays with frequencies higher than is typically possible with standard line-at-a-time driving. In particular, when aqueous solutions having high ionic strength are driven on an electrowetting device, the failure rate is much higher for low frequency driving. It is hypothesized that sustained voltage potentials facilitate electrochemistry between the ionic species and the various metals in the device. While it is possible to seal the pixel electrodes and drive lines with various dielectrics and/or polymer sealants, practically it is found that the smallest defects in the sealing layers quickly become pathways for irreversible device damage. Additionally, it has been found that higher-frequency driving results in less "slippage" of droplet position during the course of a droplet protocol. For long-lasting protocols, small slippages in droplet position can result in the failure of the protocol when two mixing droplets are not combined as planned.

Figure 3:
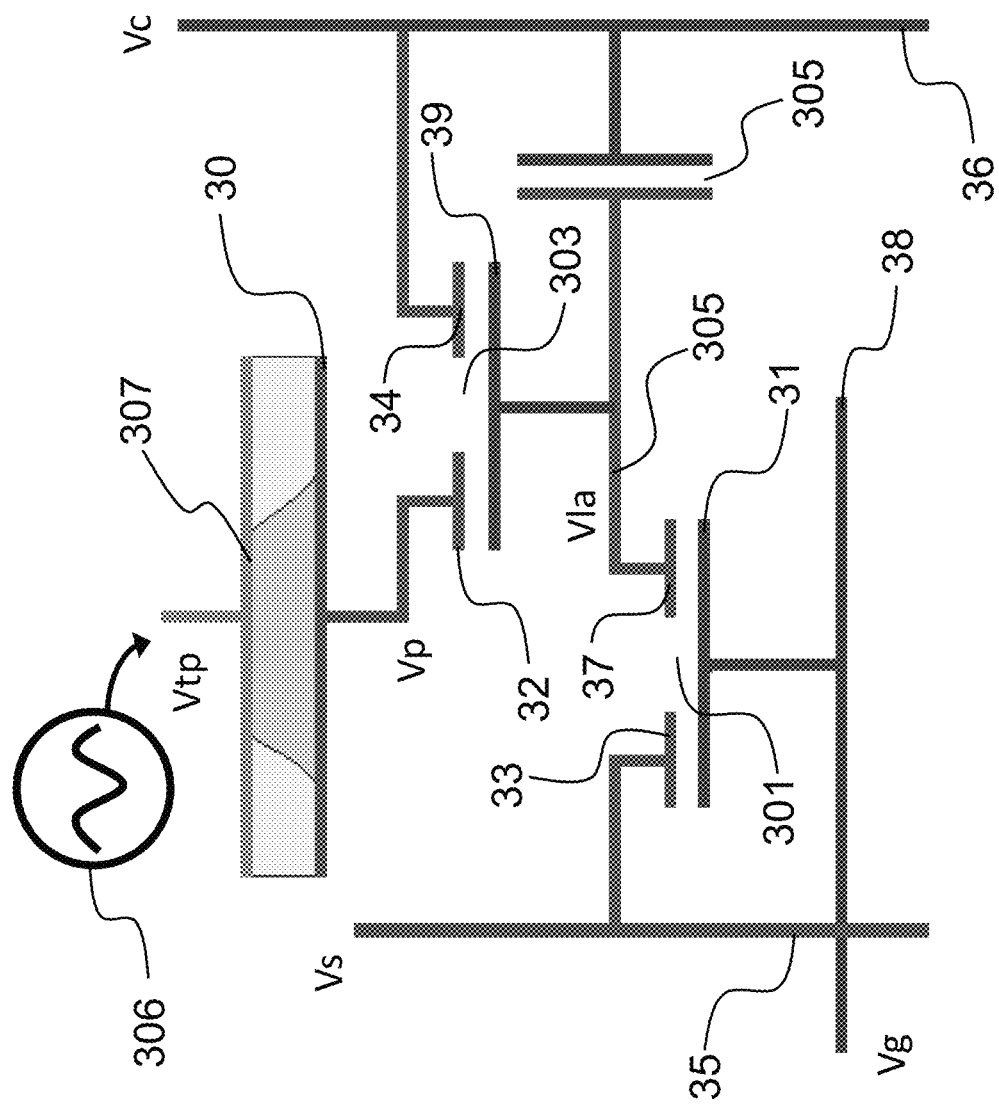
FIG. 3 is a schematic diagram of a pixel electrode connected to a pixel transistor which is in turn connected to a latching circuit.

Disclosed herein is an AM-EWoD device where the pixel electrode is no longer driven as in traditional methods. Instead, and as illustrated in the example embodiment of FIG. 3, the pixel electrode 30 is connected to a pixel transistor 303 which is in turn connected to a latching circuit, and the common top electrode 307 is connected to a top electrode driver 306. Specifically, the source of the pixel transistor 32 is connected to pixel electrode 30, and the pixel transistor drain 34 is connected to power rail 36. The gate 39 of the pixel transistor is connected to the latching circuit. In this structure, the latching circuit includes a latch transistor 301 and a storage capacitor 305. The matrix source and matrix gate lines (35 and 38, respectively) of the matrix driving system do not drive the pixel electrode in the manner of traditional arrays. Instead, matrix gate line 38 is connected to the gate 31 of the latch transistor 301, and source 33 of the latch transistor is connected to matrix source line 35. The drain 37 of the latch transistor 301 leads to pixel transistor gate 39 and to latching capacitor 305 whose function is to hold open or closed the pixel transistor.

By scanning the matrix source lines and gate lines at appropriate voltages, the pixel transistor 303 and latch transistor 301 may independently be switched on or off. This allows for latching the pixel transistor in the chosen state ("ON" or "OFF") until the matrix gate line 38 and matrix source line 35 are scanned again to leave the pixel transistor in its previous state or change it. This is illustrated in FIGS. 4A-4D, where a number of states which may be attained by scanning the matrix gate and source lines at different voltages are shown. In the embodiment shown in FIG. 4A, the difference $V_{gs1}$ between matrix gate line potential $V_g$ (+25 V) and matrix source line potential $V_s$ (+20 V) amounts to 5 V. This is sufficient to switch on the latch transistor and transfer the voltage of the source line to the latching capacitor 305 and pixel transistor gate 39, bringing potential $V_{1a}$ to +20 V. As the pixel potential $V_p$ is set to 0 V, the voltage difference $V_{gs2}$ between $V_{1a}$ and $V_p$ equals 20 V, which is usually the best $V_{gs}$ value for channel conduction in an a-Si TFT. As a result, both the latching and pixel transistors are switched on. With the addition of a 1 kHz, 30V amplitude sine wave from the top electrode driver 306, any droplet between pixel 30 (a.k.a. propulsion electrode) and the common top electrode 307 is driven at +30V to -30V at 1 kHz.

Using the "normal" line-by-line updating infrastructure, e.g., gate and scan lines, the gate line potential $V_g$ on the latch transistor 301 may be changed to a value such that the latch transistor is off. However, in this state the capacitor 305 holds open the pixel transistor 303. This is exemplified by the configuration of FIG. 4B, where $V_g$ is set to -14 V, resulting in $V_{gs1}$ being -34 V which is more than sufficient to turn off the latch transistor 301. Nonetheless, $V_{1a}$ remains unchanged at +20 V, leaving the pixel transistor "ON".

Figure 4A:
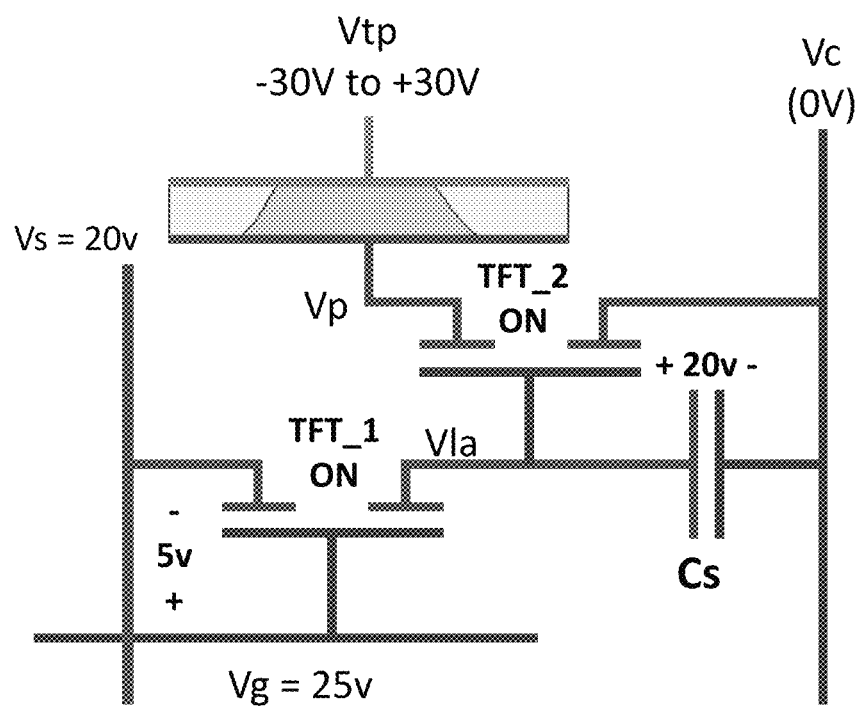
Figure 4B:
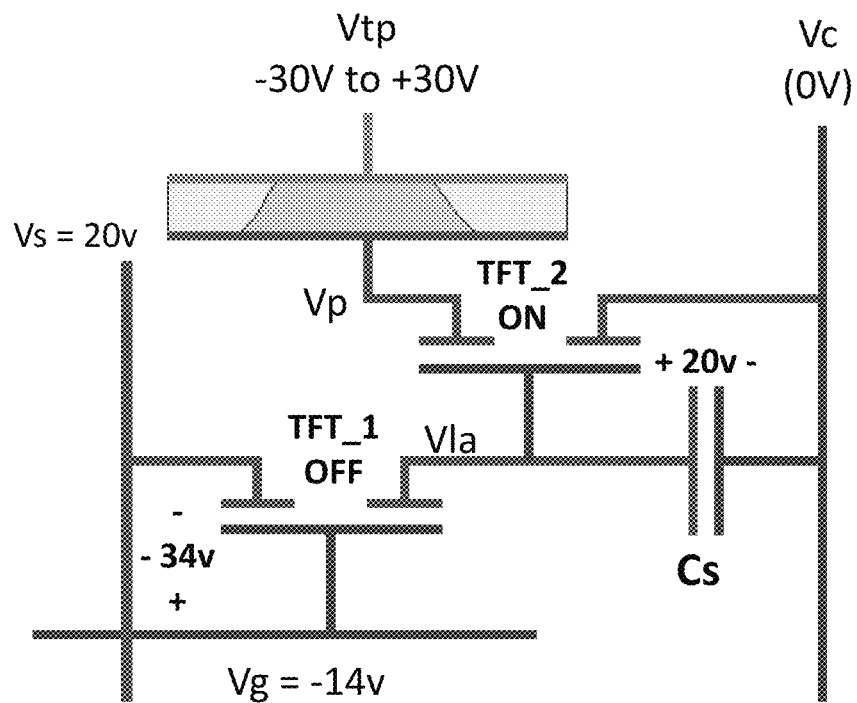
FIG. 4B is the configuration with the pixel transistor switched on and the latch transistor switched off.
Figure 4C:
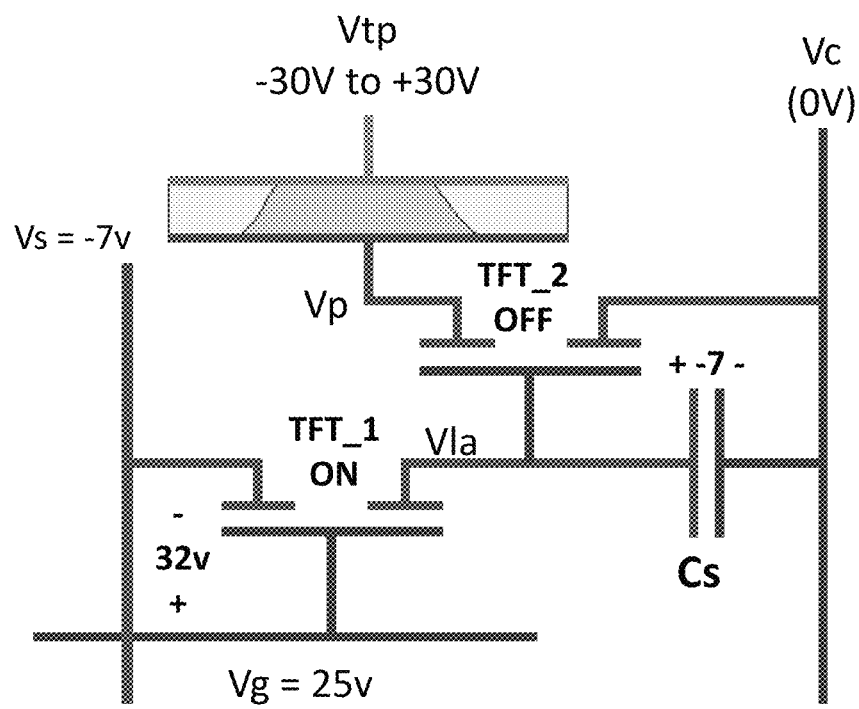
Figure 4D:
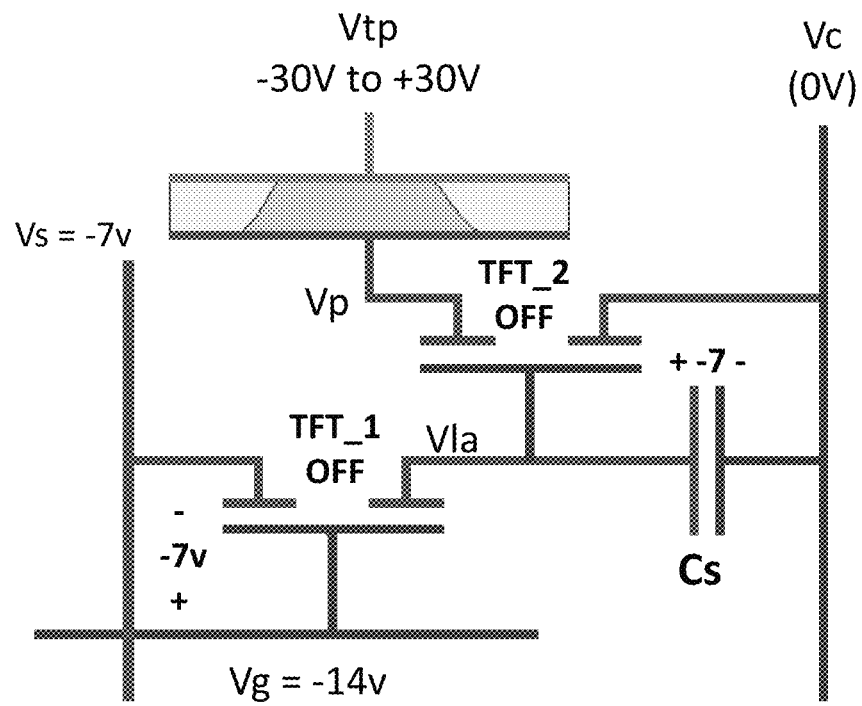
FIG. 4D is the configuration with both pixel transistor and latch transistor switched off.

As an alternative to FIG. 4B, and as illustrated in FIG. 4C, $V_g$ may be left unaltered at +25 V while source voltage $V_s$ is dropped to -7 V. The resulting $V_{gs}$ is equal to +32 V, and the voltage of the source is again transferred to the capacitor, this time resulting in Via being dropped to -7 V. In this state, the latch transistor is turned on, but the pixel transistor is switched to "OFF". In this "OFF" state the pixel electrode 30 is essentially floating, but because of the conductive pathway through the conductive droplet there is no electrical potential across the droplet and the contact angle of the droplet is not affected, as it is when there is an electric field across the droplet. Finally, as seen in FIG. 4D, $V_s$ may be left at -7 V while $V_g$ is decreased to -14 V. The resulting $V_{gs1}$ is -7 V, which is sufficient to turn off the latch transistor, as well, thereby resetting the pixel.

Figure 5A:
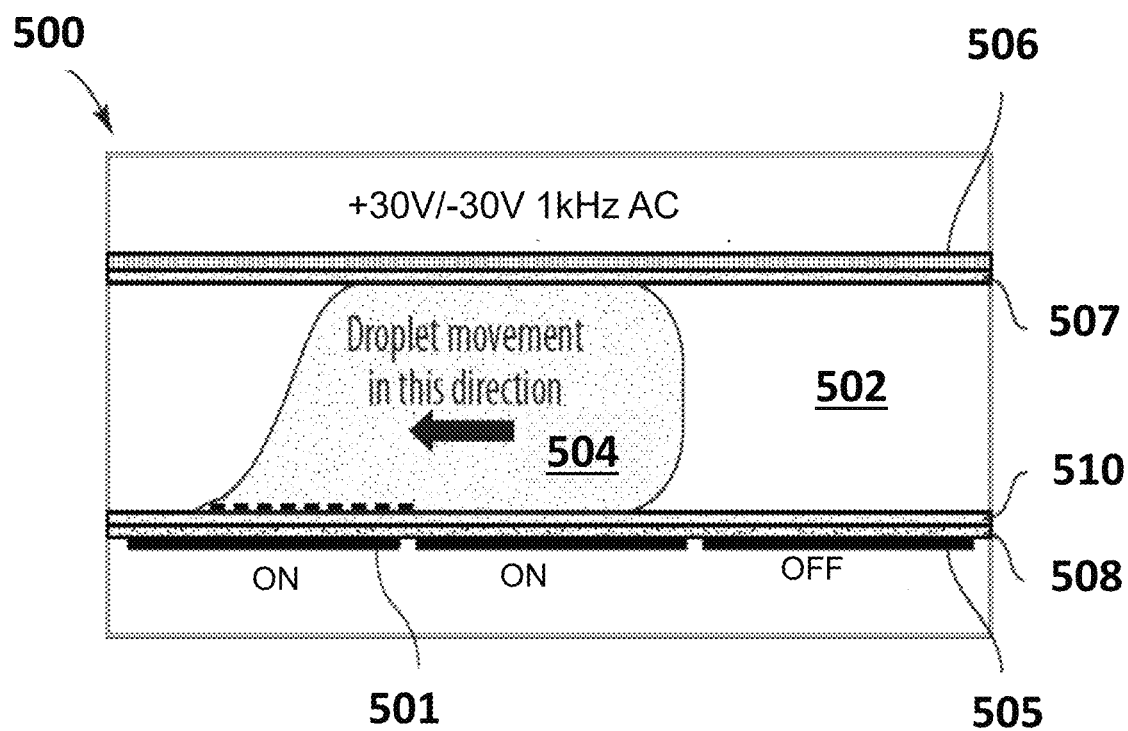
FIG. 5A illustrates an EWoD cell incorporating the invention.
Figure 5B:
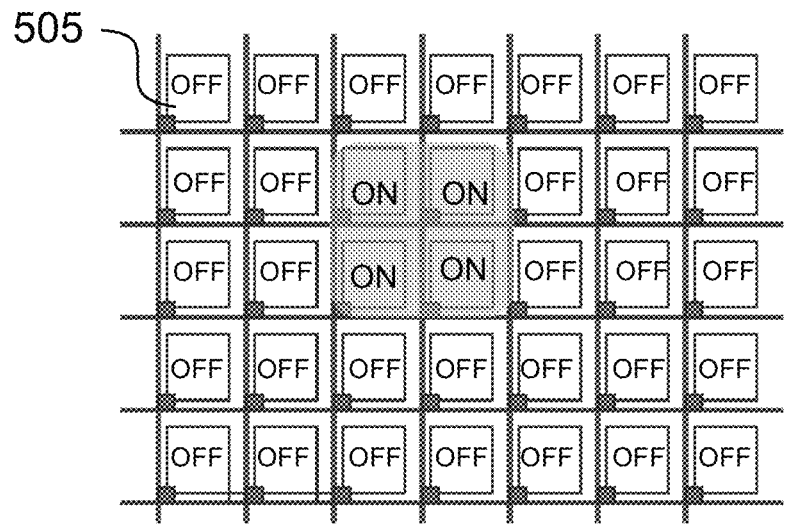
FIGS. 5B and 5C illustrate droplet movement with a latched TFT EWoD array of the invention.
Figure 5C:
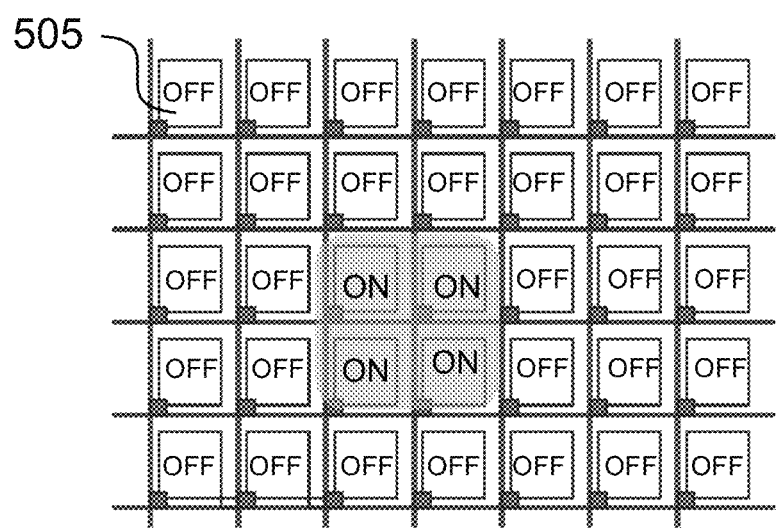

In sum, each pixel transistor may independently be switched to and latched in the desired state by scanning the matrix gate and source lines. Accordingly, the droplets can be driven between pixels as needed for the droplet protocol. This is shown in greater detail in FIG. 5A, which is a diagrammatic cross-section of the cell of a EWoD device 500 of the invention, where droplet 504 is surrounded on the sides by carrier fluid 502 and sandwiched between top hydrophobic layer 507 and bottom hydrophobic layer 510 over respective dielectric layer 508. Each propulsion electrode 505 can be set in an "ON" or "OFF" state as described above, wherein the driving potential is supplied via the top electrode 506. In many instances a spacer is disposed between the top and bottom hydrophobic layers, creating a droplet workspace that is typically in the range of about 120 µm to about 500 µm. The spacer can be made of any nonconductive material, however Teflon is often used for convenience and workability. Once the pixels have been selected and scanned according to a desired pattern, the microcontroller outputs a signal to the top electrode driver to address the whole array of pixel electrodes all at the same time. Only the pixels whose pixel transistors are latched in the "ON" state, hereby defined as "latched on pixels," are driven, so the desired pixel actuation pattern requires driving the common top electrode only once. The process for moving a droplet between a first and a second position is illustrated in FIGS. 5B and 5C.

In most droplet protocols, the droplets move relatively slowly, thus latch switching through the gate and source lines may be carried out by scanning the matrix source and gate lines at relatively lower frequencies, for example in the order of 50 Hz to 100 Hz, a feature making this embodiment of the invention particularly suitable to implementation with TFT transistor arrays and especially with a-Si TFTs. At the same time, the common top electrode may be driven at much higher frequencies, for example in the range of at least 250 Hz to at most 5 kHz, thereby addressing the pixel electrodes at much higher rates. In another embodiment, the common top electrode may be driven at frequencies in the range of at least 500 Hz to at most 1.5 kHz. In one embodiment, the common top electrode may be driven at frequencies in the range of at least 750 Hz to at most 1.25 kHz. Top electrode drivers are available from a number of suppliers, such as Advanced Energy, and are sold commercially for gel electrophoresis applications. Suitable microcontrollers may be purchased from E Ink Corporation. In one example device, microcontroller 204 signals the matrix gate drivers, matrix source drivers as would be done with an electrophoretic display, while the top electrode driver provides the needed driving voltage. The top electrode driving may be gated with a separate microcontroller signal. However, embodiments where the function of the controller is carried out by two sub-controllers, the first sub-controller signaling the matrix gate and source drivers, the second sub-controller signaling the top electrode driver, are also contemplated and within the scope of this aspect of the invention.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An active matrix electrowetting on dielectric (AM-EWoD) system, the system comprising:
   (i) a processing unit;
   (ii) a pixel array, each pixel comprising:
      a pixel electrode;
      a pixel transistor comprising a source, a drain, and a gate, the pixel transistor source operably connected to the pixel electrode, and the pixel transistor drain operably connected to a matrix power rail;
      a latching circuit operably connected to the pixel transistor gate, a matrix gate line, a matrix source line, and the matrix power rail,
         the latching circuit being configured to latch the pixel transistor in an on state or an off state controlled by a state of the matrix gate line and a state of the matrix source line;
   (iii) a plurality of matrix gate drivers, each matrix gate driver being operably connected to a matrix gate line;
   (iv) a plurality of matrix source drivers, each matrix source driver being operably connected to a matrix source line;
   (v) a power source operably connected to the plurality of matrix power rails;
   (vi) a top plane common electrode disposed in opposition to the pixel array, the top plane common electrode operably connected to a top plane common electrode driver and configured to provide a time-variable voltage; and
   (vii) a controller operably connected to the matrix gate driver, matrix source driver, and the top plane common electrode driver, the controller being configured to receive instructions from the processing unit to latch pixel transistors in an on state or an off state.

2. The AM-EWoD system according to claim 1, wherein the latching circuit comprises:
   a latch transistor comprising a source, a drain, and a gate, the latch transistor being operably connected to the matrix gate line and matrix source line; and
   a latching capacitor operably connected to the pixel gate, the drain of the latch transistor, and the matrix power rail.

3. The AM-EWoD system according to claim 2, wherein the pixel transistors and the latch transistors are thin film transistors (TFT).

4. The AM-EWoD system according to claim 3, wherein the pixel transistors and the latch transistors comprise a layer of amorphous silicon (a-Si TFT).

5. The AM-EWoD system according to claim 3, wherein the pixel transistors and the latch transistors comprise a layer of metal oxide semiconductor.

6. The AM-EWoD system according to claim 1, wherein the top plane common electrode driver is configured to provide a time-variable voltage having a frequency between 250 Hz and 5 kHz.

7. The AM-EWoD system according to claim 1, wherein the top plane common electrode driver is configured to provide a time-variable voltage having a frequency between 500 Hz and 1.5 kHz.

8. The AM-EWoD system according to claim 1, wherein the top plane common electrode driver is configured to provide a time-variable voltage having a frequency between 750 Hz and 1.25 kHz.

9. The AM-EWoD system according to claim 1, wherein the top plane common electrode driver is configured to operate at a frequency higher than or equal to the latch driving frequency.

10. The AM-EWoD system according to claim 1, wherein the controller includes a first sub-controller operably connected to the matrix gate drivers and matrix source drivers, and a second sub-controller operably connected to the top plane common electrode driver.

11. The AM-EWoD system according to claim 1, further comprising a spacer between the pixel array and the top plane common electrode.

12. A method of driving an active matrix electrowetting on dielectric (AM-EWoD) system, the system comprising:

(i) a processing unit;
(ii) a pixel array, each pixel comprising:
   a pixel electrode;
   a pixel electrode;
   a pixel transistor comprising a source, a drain, and a gate, the pixel transistor source operably connected to the pixel electrode, and the pixel transistor drain operably connected to a matrix power rail;
   a latching circuit operably connected to the pixel transistor gate, a matrix gate line, a matrix source line, and the matrix power rail,
      the latching circuit being configured to latch the pixel transistor in an on state or an off state controlled by a state of the matrix gate line and a state of the matrix source line;
(iii) a plurality of matrix gate drivers, each matrix gate driver being operably connected to a matrix gate line;
(iv) a plurality of matrix source drivers, each matrix source driver being operably connected to a matrix source line;
(v) a power source operably connected to the plurality of matrix power rails;
(vi) a top plane common electrode disposed in opposition to the pixel array, the top plane common electrode operably connected to a top plane common electrode driver and configured to provide a time-variable voltage; and
(vii) a controller operably connected to the matrix gate driver, matrix source driver, and the top plane common electrode driver, the controller being configured to receive instructions from the processing unit to latch pixel transistors in an on state or an off state;
the method comprising:
receiving input instructions into the processing unit, the input instructions relating to a droplet operation to be performed by the AM-EWoD;
outputting matrix gate line and matrix source line selecting instructions from the processing unit to the controller,
outputting a matrix gate line signal from the controller to the driver of a matrix gate line and a matrix source line signal from the controller to the driver of a matrix source line, to switch the latching circuit of at least one pixel, and outputting a time-variable top common electrode signal from the top plane common electrode driver to the top plane common electrode driver, to drive latched on pixels.

13. The method of driving an AM-EWoD system according to claim 12, wherein the latching circuit comprises:
   a latch transistor comprising a source, a drain, and a gate, the latch transistor being operably connected to the matrix gate line and matrix source line; and
   a latching capacitor operably connected to the pixel gate, the drain of the latch transistor, and the matrix power rail.

14. The method of driving an AM-EWoD system according to claim 13, wherein the pixel transistors and latch transistors are thin film transistors (TFT).

15. The method of driving an AM-EWoD system according to claim 14, wherein the pixel transistors and latch transistors are amorphous silicon thin film transistors (a-Si TFT).

16. The method of driving an AM-EWoD system according to claim 12, wherein the top plane common electrode driver is configured to provide a time-variable voltage having a frequency between 250 Hz and 5 kHz.

17. The method of driving an AM-EWoD system according to claim 12, wherein the top plane common electrode driver is configured to provide a time-variable voltage having a frequency between 500 Hz and 1.5 kHz.

18. The method of driving an AM-EWoD system according to claim 12, wherein the top plane common electrode driver is configured to provide a time-variable voltage having a frequency between 750 Hz and 1.25 kHz.

19. The method of driving an AM-EWoD system according to claim 12, wherein the top plane common electrode is driven at a frequency higher than or equal to the latch driving frequency.

20. The method of driving an AM-EWoD system according to claim 12, wherein the controller includes a first sub-controller operably connected to the matrix gate drivers and matrix source drivers, and a second sub-controller operably connected to the top plane common electrode driver.

* * * * *